J. M. CORNELL.

Improvement in Machines for Shearing the Ends of Beams.

No. 5,097.

Reissued Oct. 15, 1872.

Witnesses:

Alban E. Stimers

Amos Broadway

John M. Cornell

AM. PHOTO-LITHOGRAPHIC CO. N.Y. (OSBORNE'S PROCESS.)

UNITED STATES PATENT OFFICE.

JOHN M. CORNELL, OF NEW YORK, N. Y.

IMPROVEMENT IN MACHINES FOR SHEARING THE ENDS OF BEAMS.

Specification forming part of Letters Patent No. 130,486, dated August 13, 1872; reissue No. 5,097, dated October 15, 1872.

*To all whom it may concern:*

Be it known that I, JOHN M. CORNELL, of the city and county of New York and State of New York, have invented a new and useful Machine for Shearing the Ends of Iron Beams; and I do hereby declare the following to be a clear and exact description of the same, reference being had to the annexed drawing making part of this specification, in which—

Figure 1:
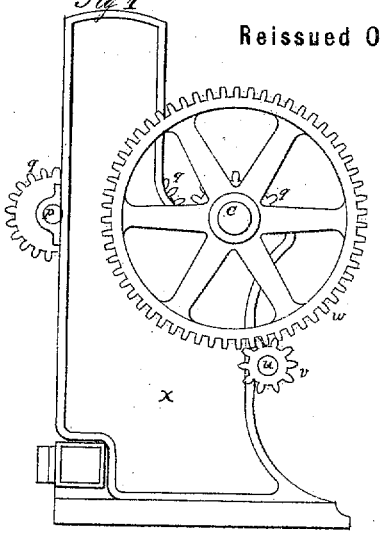
Figure 2:
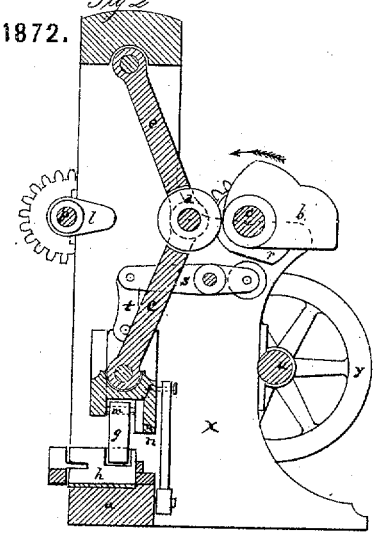
Figure 4:
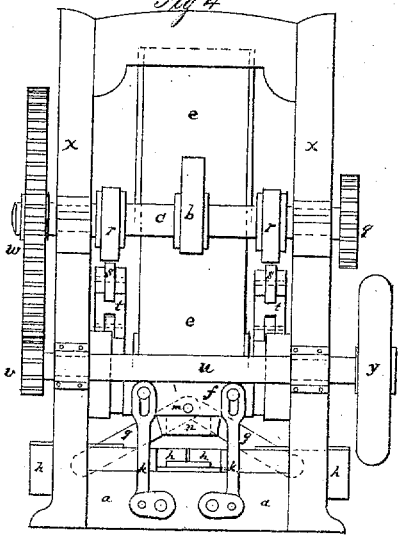
Figure 3:
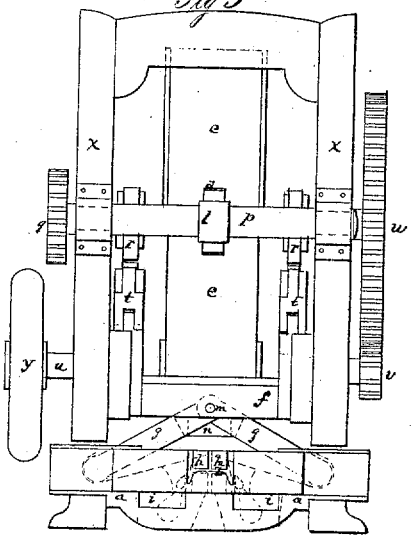
Figure 5:
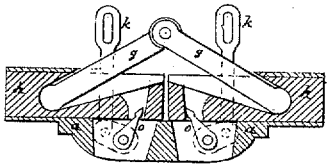

Figure 1 represents an end elevation, Fig. 2 a transverse sectional elevation, Fig. 3 a front elevation, Fig. 4 a back view elevation, and Fig. 5 a vertical section viewed from the front, of the bed of the machine *a a*.

The object of my invention is to reduce the expense of so cutting off the ends of a wrought-iron beam that it will properly fit in the side of a corresponding beam running at an angle to it, in the construction of buildings, bridges, or other mechanical works of art, without heating the ends of the beam thus cut. This object I accomplish by a novel method, through the use of mechanism, such, for example, as the machine shown by the drawing, which I call an iron-beam shearing-machine. It first cuts away the flanges and then shears off the web to the proper form, all by one revolution of the main shaft of the machine.

The drawing represents such a machine, where C is the main shaft, carrying the cam *b*, which, revolving in the direction of the arrow, acts upon the friction-wheel *d*, operating the knuckle-joint of the levers *e e*, depressing the slide *f*, which carries the shear-blade *n* and the controlling-pin *m* of the jointed bars *g g*. These jointed bars carry laterally outward the two shear-blades *h h*. These are brought toward each other again at the proper time by the small levers *o o*, Fig. 5, connected through the rock-shafts and levers shown, and the connecting-rods *k k* to the back part of the slide *f*. This slide *f* is elevated by having, first, the knuckle-jointed bars *e e* thrown out of the same straight line in which they were standing at the moment of greatest depression of the slide by the cam *b* acting upon the roller *d* of the knuckle-joint, and then by the action of the cams *r r* upon the free ends of the levers *s s*, which are connected to the slide by the rods *t t*. The cam *l* is fixed upon the shaft *p*, which is made to revolve in equal times with the main shaft through the medium of the gear-wheels *q q q*, the function of this cam being to throw back the knuckle-joint and commence the elevation of the slide *f*, as above described. The main shaft is drawn by the driving-shaft *u*, through the medium of the pinion *v* and the gear-wheel *w*. On the driving-shaft is fixed the fly-wheel *y*, which may also serve as a band-wheel if it is desired to drive the machine with a belt. All these shafts are carried in appropriate bearings secured to the strong iron framework *x x*.

The operation of the machine is as follows: The machine being in motion at its regular speed, the end of the beam to be cut is inserted into the front of the machine at *z*, the beam lying horizontally upon its side. It is carried in until the end comes against the slides forming the base of the flange-shears *h h*. The continued revolution of the main-shaft causes the slide *f* to descend and the shears *h h* to move outwardly, as already described. This lateral action of these shears cuts away the flanges of the beam to the desired extent, the pieces cut off falling down and out of the machine through the openings *i i*. When the flanges have been cut away and the flange-shears have moved far enough to permit of it, the beam is carried further into the machine until the newly-cut ends of the flanges come in contact with the face of the peculiarly-formed shear-blade *n*. While in this position the web of the beam is between the shears, the blade *n* descending by the action of the longer part of the cam *b*, acting upon the knuckle-joint, cuts the web to the desired length and form, and the beam is removed. The machine continues in idle operation until another beam end is inserted, and then it does its work promptly, as before.

The method of performing this operation, heretofore in use, is to heat the end of the beam to redness in a forge-fire, and then cut it, with a hot chisel and sledge, to the desired form, in the well-known blacksmith fashion of doing such work.

It will be perceived that, by the use of this machine, it is no more labor to cut off the beam to the desired form than it has been heretofore to insert it into the forge-fire. All the remaining portion of the work, and the time spent waiting for the beam to heat, &c., is saved by the use of this machine.

The importance of this is partially measured by the fact that about five per cent. is added to the cost of beams when the ends have to be fitted to the sides of corresponding beams.

I claim as my invention—

The web-cutter *n* and the flange-cutters *h h*, made and combined to cut away the flanges and trim the end of web, in the manner substantially as described.

JOHN M. CORNELL.

Witnesses:

ALBAN C. STIMERS,

AMOS BROADNAX.